United States Patent
Bernhard et al.

(10) Patent No.: US 8,351,233 B2
(45) Date of Patent: Jan. 8, 2013

(54) CLOSED-LOOP CONTROL METHOD FOR AN HVDC TRANSFER INSTALLATION HAVING A DC VOLTAGE INTERMEDIATE CIRCUIT AND SELF-COMMUTATED CONVERTERS

(75) Inventors: Tobias Bernhard, Hirschaid (DE); Mike Dommaschk, Cottbus (DE); Jörg Dorn, Buttenheim (DE); Ingo Euler, Erlangen (DE); Franz Karlecik-Maier, Höchstadt (DE); Jörg Lang, Stadtsteinach (DE); Jürgen Rittiger, Herzogenaurach (DE); John-William Strauss, Tiburon, CA (US); Quoc-Buu Tu, Rosstal (DE); Oliver Venjakob, Erlangen (DE); Carsten Wittstock, Nürnberg (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/999,900

(22) PCT Filed: Jun. 17, 2008

(86) PCT No.: PCT/EP2008/005211
§ 371 (c)(1),
(2), (4) Date: Apr. 6, 2011

(87) PCT Pub. No.: WO2009/152840
PCT Pub. Date: Dec. 23, 2009

(65) Prior Publication Data
US 2011/0205771 A1  Aug. 25, 2011

(51) Int. Cl.
*H02M 7/00* (2006.01)
*H02M 7/537* (2006.01)

(52) U.S. Cl. ........................................ 363/125; 363/131

(58) Field of Classification Search ............... 363/34–37, 363/125, 131
See application file for complete search history.

(56) References Cited

U.S. PATENT DOCUMENTS
4,443,747 A * 4/1984 Chausse et al. ............... 318/723
(Continued)

FOREIGN PATENT DOCUMENTS
DE       195 44 777 C1    12/1996
(Continued)

OTHER PUBLICATIONS

Karlecik-Maier, F., "A New Closed Loop Control Method for HVDC Transmission", IEEE Transactions on Power Delivery, Oct. 1996, pp. 1955-1960, vol. 11, No. 4, IEEE Service Center, New York, NY, US.

*Primary Examiner* — Adolf Berhane
(74) *Attorney, Agent, or Firm* — Laurence A. Greenberg; Werner H. Stemer; Ralph E. Locher (57) ABSTRACT

In the method for closed-loop control of at least two converters in an energy transmission and/or distribution system, each rectifier regulator and each inverter regulator provides a differential DC voltage from the difference between a given set DC voltage and the relevant received measured DC voltage, and also provides a differential DC current from a differential DC current from the difference between a set DC current and the corresponding received measured DC current. Each converter is a self-commutated converter with power semiconductors. The rectifier regulation of the provided converter is regulated such that the sum of the product of the differential voltages and the value of given set DC current at the corresponding rectifier and the differential current is a minimum. The inverter regulation regulates the corresponding inverter such that the sum between the differential voltage and the differential current is a minimum.

16 Claims, 4 Drawing Sheets

U.S. PATENT DOCUMENTS 5,585,708 A * 12/1996 Richardson et al. .......... 318/800
6,697,274 B2 * 2/2004 Bernet et al. .................. 363/132
7,729,142 B2 6/2010 Karlecik-Maier
7,969,755 B2 * 6/2011 Davies et al. ................... 363/35
8,054,657 B2 * 11/2011 Gruber et al. ................... 363/36

FOREIGN PATENT DOCUMENTS

WO 2007/033619 A1 3/2007

* cited by examiner

CLOSED-LOOP CONTROL METHOD FOR AN HVDC TRANSFER INSTALLATION HAVING A DC VOLTAGE INTERMEDIATE CIRCUIT AND SELF-COMMUTATED CONVERTERS

BACKGROUND OF THE INVENTION

Field of the Invention

The invention relates to a method for closed-loop control of at least two converters, which can be controlled as rectifiers or inverters and are connected to one another via a DC voltage link, in the field of power transmission and/or distribution, in which a measurement DC voltage (Udc_r1 ... Udc_rr; Udc_i1 ... Udc_ii) and a measurement direct current (Idc_r1 ... Idc_rr; Idc_i1 ... Idc_ii) are in each case measured at each converter and are transmitted to a rectifier regulator for closed-loop control of the respective rectifier, or are transmitted to an inverter regulator for closed-loop control of the respectively associated inverter, wherein each rectifier regulator and each inverter regulator in each case forms the difference between a predetermined nominal DC voltage (Udco) and the respectively received measurement DC voltage (Udc_r1 ... Udc_rr; Udc_i1 ... Udc_ii), producing a difference DC voltage (du) and, furthermore, the difference between a nominal direct current (Idco_r1 ... Idco_rr, Idco_i1 ... Idco_ii) and the respectively received measurement direct current (Idc_r1 ... Idc_rr; Idc_i1 ... Idc_ii), producing a difference direct current (di), where the measurement direct current, the measurement DC voltage, the nominal direct current and the nominal DC voltage are in a normalized form.

A method such as this is already known from WO 2007/033620 A1, which describes a closed-loop control method for high-voltage direct-current transmission in which electrical power is transmitted between AC voltage systems via a direct-current circuit. The high-voltage direct-current transmission (HVDCT) installation which is used for power transmission consists of a rectifier and an inverter, which are connected to one another via a direct current link. Transformers are provided in order to couple the converters to the respectively associated AC voltage system. For closed-loop control of the rectifier or inverter, a measurement DC voltage Udc_r or Udc_i, and a respective measurement direct current, Idc_r or Idc_i respectively, are recorded and are transmitted to the respective closed-loop control system both at the rectifier and at the inverter. A nominal DC voltage Udco and a nominal direct current Idco are determined from the predetermined power which is intended to be transmitted, with the aid of a function transmitter. The difference DC voltage du is then calculated from the difference between the nominal DC voltage Udco and the measurement DC voltage Udc_r, Udc_i. The difference direct current di is correspondingly formed from the difference between the nominal direct current Idco and the respectively determined measurement direct current Idc_r and Idc_i. All the values are in this case in normalized form, with the normalization process being carried out, for example, with respect to a rated DC voltage and a rated direct current, or else with respect to a nominal direct current and the nominal DC voltage. The rectifier regulator now controls the rectifier in such a way that the sum of the difference DC voltage du and of the difference direct current di is a minimum. The inverter regulator in contrast controls the inverter such that the difference between the difference direct current di and the difference DC voltage du is a minimum. The already known methods are, however, suitable only for so-called externally commutated converters, in which, for example, thyristors are used which cannot be turned off by means of trigger signals. Converters such as these allow current to flow in only one direction in the direct current circuit. The power flow can be reversed only by reversing the polarity of the voltage across the respective converter. Furthermore, in this installation, which is referred to in the following text as a traditional HVDCT installation, the operating current must always be greater than 0.05 p.u., because of the need to avoid intermittent currents in the current nominal value. This allows the above-mentioned normalization with respect to the nominal values.

As a result of the progressive improvement in the field of power electronics, it has become possible to also use power semiconductors which can be turned off, for example IGBTs or GTOs, for converters in the field of power transmission, and in particular for HVDCT. A converter such as this, which is also called a voltage source converter (VSC), is connected to a further VSC via a DC voltage intermediate circuit. Each power semiconductor which can be turned off in the converter has a freewheeling diode connected in parallel with it. The power flow is no longer reversed by reversing the polarity of the voltage on the respective VSC but by reversing the current flowing via the respective VSC. Furthermore, direct current nominal values equal to zero can be used for the respective VSC. It is therefore impossible to use the method of this generic type for controlling a VSC in an HVDCT installation.

WO 2007/033619 A1 discloses a closed-loop control method for direct current transmission having a plurality of converters, in which the method mentioned above is likewise used. In this case as well, nominal currents of more than 0.05 p.u. are required, in particular at the rectifier, in order to avoid intermittent currents.

BRIEF SUMMARY OF THE INVENTION

The object of the invention is to provide a method of the type mentioned initially, which allows closed-loop control to be carried out for converters which have power semiconductors which can be turned off and are connected to one another via a DC voltage intermediate circuit, while at the same time making it possible to preset nominal currents equal to zero.

The invention achieves this object in that each converter is a self-commutated converter (1) having power semiconductors which can be turned off, and the rectifier regulator controls the respectively associated converter such that the sum of the product of the difference DC voltage (du) and the magnitude of the nominal direct current (|Idco_r|), which is provided at the respectively associated rectifier, and the difference direct current (di) is a minimum (du*|Idco_r|+di→Min) and the inverter regulator controls the respectively associated converter such that the sum between the difference DC voltage (du) and the difference direct current (di) is a minimum (du+di→Min).

The invention transfers the closed-loop control method known from traditional HVDCT to HVDCT installations in which VSCs and a DC voltage intermediate circuit are used. In the case of these so-called voltage source converters (VSC), the voltage polarity can no longer be reversed because of the DC voltage intermediate circuit, by which means the power flow is reversed in a conventional HVDCT. In converters (VSCs) such as these, the power flow is reversed by reversing the current flow. These physical differences are taken into account in the closed-loop control method according to the invention. Furthermore, the method according to the invention also makes it possible to preset nominal currents with a value of zero. This was impossible in the case of the known closed-loop control methods for conventional HVDCT. The method according to the invention therefore provides simple and flexible closed-loop control for two or more VSCs which are connected to one another via a DC voltage link.

The DC voltage link has a polarity which does not change during operation of the HVDCT installation, within the scope of the invention, even when the power flow is reversed. In this case, for example, the DC voltage link is a bipolar DC voltage link which extends between two converters. According to this variant, the HVDCT installation to be controlled consists of a rectifier, which is connected via an inductance, for example a transformer, to an AC voltage system which provides power. The inverter, which is connected to said rectifier via the bipolar DC voltage link, is likewise connected via an inductance, for example a transformer, to a second AC voltage system, which, for example, has the loads to be supplied. However, in contrast to this, a plurality of converters can also be controlled using the method according to the invention, wherein the converters, or in this case the VSCs, are connected to one another via a DC voltage link with any desired topology. The method according to the invention is completely independent of the topology of the DC voltage link.

Expediently, the nominal DC voltage Udco of each rectifier regulator and the nominal DC voltage Udco of each inverter regulator are identical. Complex definition of the nominal DC voltage at each converter station, with rapid and reliable telecommunication for signaling the respective nominal DC voltage to other stations, has therefore become superfluous within the scope of the invention.

Expediently, the converters are at a distance of at least 1 kilometer from one another. All HVDCT installations which use the so-called back-to-back configuration, in which inverters and converters are installed physically alongside one another and are used only for coupling different AC voltage systems in a manner which can be subjected to closed-loop control, are excluded from this expedient further development. The apparatus for which the method according to this advantageous further development is designed is therefore used to transmit electrical power over a relatively long distance.

Advantageously, each measurement DC voltage Udc_rr or Udc_ii and the nominal DC voltage Udco are normalized with respect to the nominal DC voltage Udco. This allows stable closed-loop control, in particular when the power levels to be transmitted are low. This normalization, which is already known from conventional HVDCT, is, however, carried out for the purposes of the exemplary embodiment according to the invention only in conjunction with the respective measurement and nominal DC voltage. In contrast, the nominal direct current is not normalized, in order to allow the use of nominal direct currents equal to zero in this expedient further development of the invention as well.

Advantageously, two converters are provided, one of which is operated as a rectifier and the other converter is operated as an inverter, wherein a DC voltage intermediate circuit extends between the rectifier and the inverter. According to this refinement, the method is used for an HVDCT installation with VSCs and a DC voltage intermediate circuit without any branches. For example, the DC voltage intermediate circuit is designed with one pole, using the ground as the return conductor. In contrast to this, the DC voltage link has two poles, with the positive pole and negative pole of the DC voltage link being in the form of cable conductors.

According to one refinement, which differs from this, the method according to the invention is provided for at least three converters, between which a DC voltage system extends.

The DC voltage system may have any desired topology.

According to one expedient further development in this context, a respectively associated rectifier nominal DC power (Pdco_r1 . . . Pdco_rr) or inverter nominal DC power (Pdco_i1 . . . Pdco_ii) is in each case defined for each rectifier regulator and for each inverter regulator, respectively, wherein the sum of all the rectifier nominal DC powers and all the inverter nominal DC powers is equal to zero. By way of example, the respective nominal DC power levels are defined by a central control center and are transmitted from there to the respective converter regulators. There is no need whatsoever for a powerful communication link for transmission, for example as is the case with a conventional HVDCT. For the purposes of the invention, it is sufficient to transmit the respective nominal DC power levels via the Internet, or any other simple, and therefore cost-effective, form of telecommunication to the respective regulator.

Expediently, the nominal direct current respectively associated with the converter is determined at each converter from the nominal DC power associated with it and from the nominal DC voltage, which is common to all of them. According to this advantageous further development, the method according to the invention is simple and clear.

Expediently, the closed-loop control of each rectifier and each inverter is carried out over the entire operating range of the rectifier or of the inverter both on the basis of the respectively associated rectifier difference direct current (di_r1 . . . di_rr) and on the basis of the rectifier difference DC voltage (du_r1 . . . du_rr) and, respectively, on the basis of the respectively associated inverter difference direct current (di_r1 . . . di_rr) and on the basis of the associated inverter difference DC voltage (du_i1 . . . du_ii).

Advantageously, a respective measurement DC voltage (Udc_r1 . . . Udc_rr; Udc_i1 . . . Udc_ii) and a respective measurement direct current (Idc_r1 . . . Idc_rr; Idc_i1 . . . Idc_ii) are measured at each converter and are transmitted to a rectifier regulator or to an inverter regulator.

According to one expedient further development in this context, a number of converters are controlled such that a direct current which flows through an isolating switch which is arranged in the DC voltage link is equal to zero. According to this advantageous further development, simple isolating switches can be used in the DC voltage link, since switching can always take place when no current is flowing. Complex resonant circuits which apply a zero crossing to the current by means of the switch, thus extinguishing any arc which is struck on switching, have likewise been rendered superfluous by this advantageous refinement of the invention.

According to one modification in this context, at least one converter controls the respective measurement direct current recorded at it at zero, and at least one isolating switch, which is arranged in the DC voltage link, is then opened. Zero current regulation is carried out by using a nominal direct current equal to zero. According to one preferred refinement of this further development, all the converters which are connected to one another by a DC voltage link are controlled to zero. In other words, a nominal direct current zero is used for each regulator.

According to one expedient further development in this context, a switching-off time is set and is transmitted to the respectively affected regulators, wherein said regulators control the measurement direct current associated with them to be zero when the switching-off time is reached. According to this expedient further development, all the regulator units have a time signal transmitter, for example an accurate clock, which provides a common, or substantially common, time signal for all the regulators. This time signal is compared with the set and transmitted switching-off time. If the difference between the switching-off time and the measured time is less than a threshold value set in advance, that is to say when the switching-off time is reached, the respective regulating unit presets a nominal direct current of zero, such that the measurement direct current is controlled at zero. This refinement ensures that all the affected regulators which, for example, are selected as such by a central control station, or all the regulators, are transferred to zero-current control at the same time.

According to one expedient further development in this context, the measurement direct current is controlled to be zero by each affected converter over a zero-current time period, and the normal closed-loop control method is then restarted, that is to say once the zero-current time period has elapsed. Within the zero-current time period which, for example, is in the region of a few milliseconds, the desired isolating switch or switches in the DC voltage link is or are now opened. This makes it possible, in a simple manner, to deliberately disconnect an area or a converter from the DC voltage system with any desired topology, without likewise having to interrupt the power transmission via those links or converters which have not been turned off. In fact, within the scope of the invention, it is possible to disconnect a section of the DC voltage link or a converter specifically from the DC voltage system by rapidly reducing the direct current. The normal closed-loop control of the HVDCT installation is then started again. The closed-loop control method according to the invention then automatically approaches the regulator operating points required for this purpose, without any knowledge of the new topology of the DC voltage link. Complex data transmissions, calculations or the like have become superfluous as a result of the invention.

Further expedient refinements and advantages of the invention are the subject matter of the following description of exemplary embodiments of the invention, with reference to the figures of the drawing, in which the same reference symbols refer to components having the same effect, and in which:

DESCRIPTION OF THE INVENTION

Figure 1:
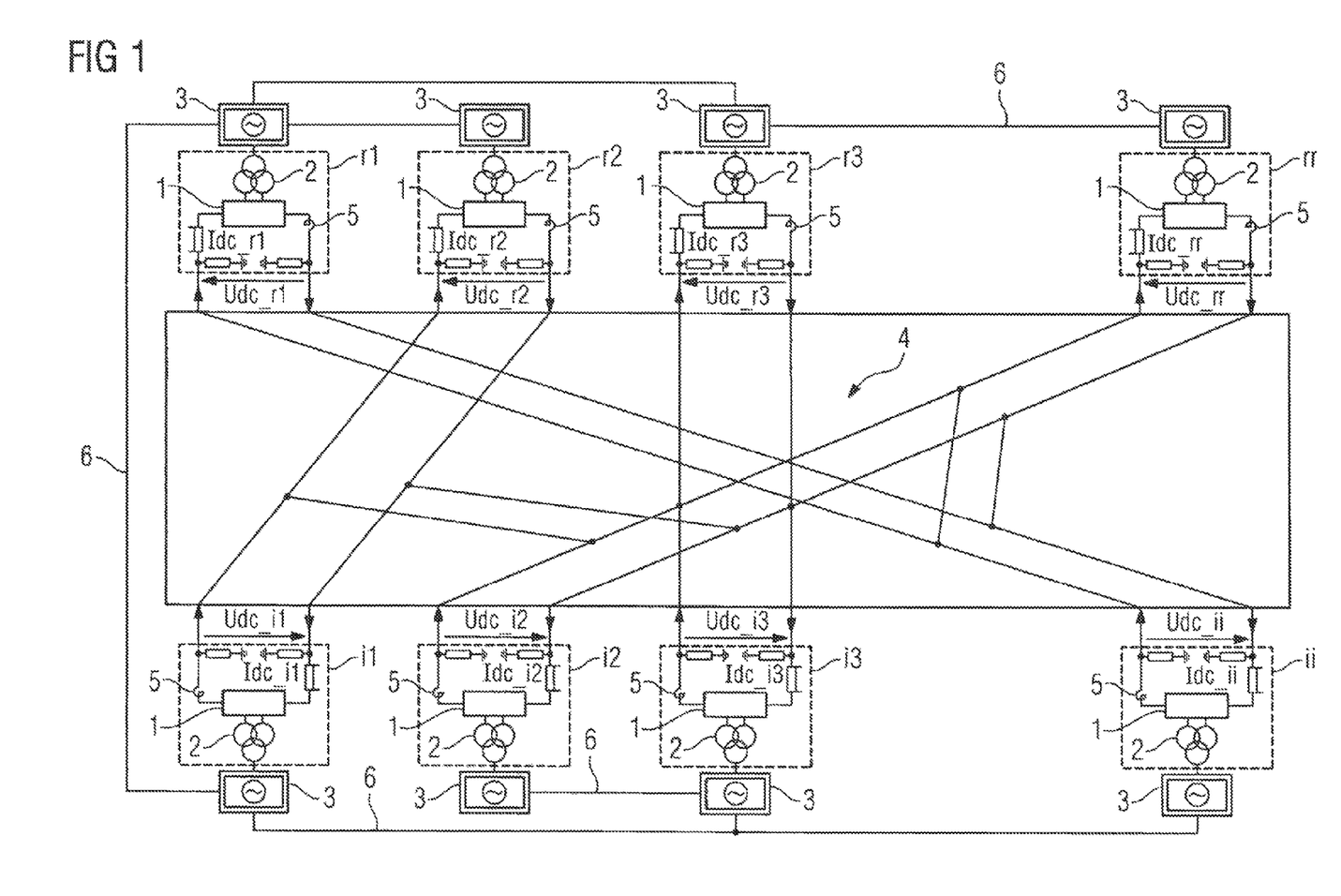
FIG. 1 shows an HVDCT installation having a plurality of voltage source converters, which are connected to one another via a DC voltage system.

FIG. 1 schematically illustrates an HVDCT installation having a multiplicity of converters 1, which are each connected via a transformer 2 to an AC voltage system 3. Each converter 1 is a so-called voltage source converter (VSC), having power semiconductors which can be turned off, such as IGBTs or GTOs, each of which has a freewheeling diode connected back-to-back in parallel with it. In this case, each converter 1 is connected to a DC voltage system 4 as a DC voltage link, which DC voltage system 4 may have any desired topology. Furthermore, each VSC 1 has an associated smoothing inductor 5. A VSC 1, a transformer 2, and a smoothing inductor 5 are part of a rectifier station or inverter station, depending on how the respective VSC is controlled by the regulating unit or regulator, which is not illustrated in the figure. In FIG. 1, those rectifier stations which have VSCs operated at rectifiers are annotated r1, r2, r3 . . . rr, whereas those inverter stations with VSCs which are operated as inverters are annotated i1, i2, i3 . . . ii. FIG. 1 also shows that each converter station rr and each inverter station ii has sensors for recording the measurement DC voltage Udc_rr at this station as well as the direct current Idc_rr or Idc_ii flowing there at the VSC 1. As can likewise been seen from FIG. 1, the respective AC voltage systems 3 are also connected to one another via AC voltage links 6. The alternating current link 6 does not adversely affect the method according to the invention for closed-loop control of the VSC.

Figure 2:
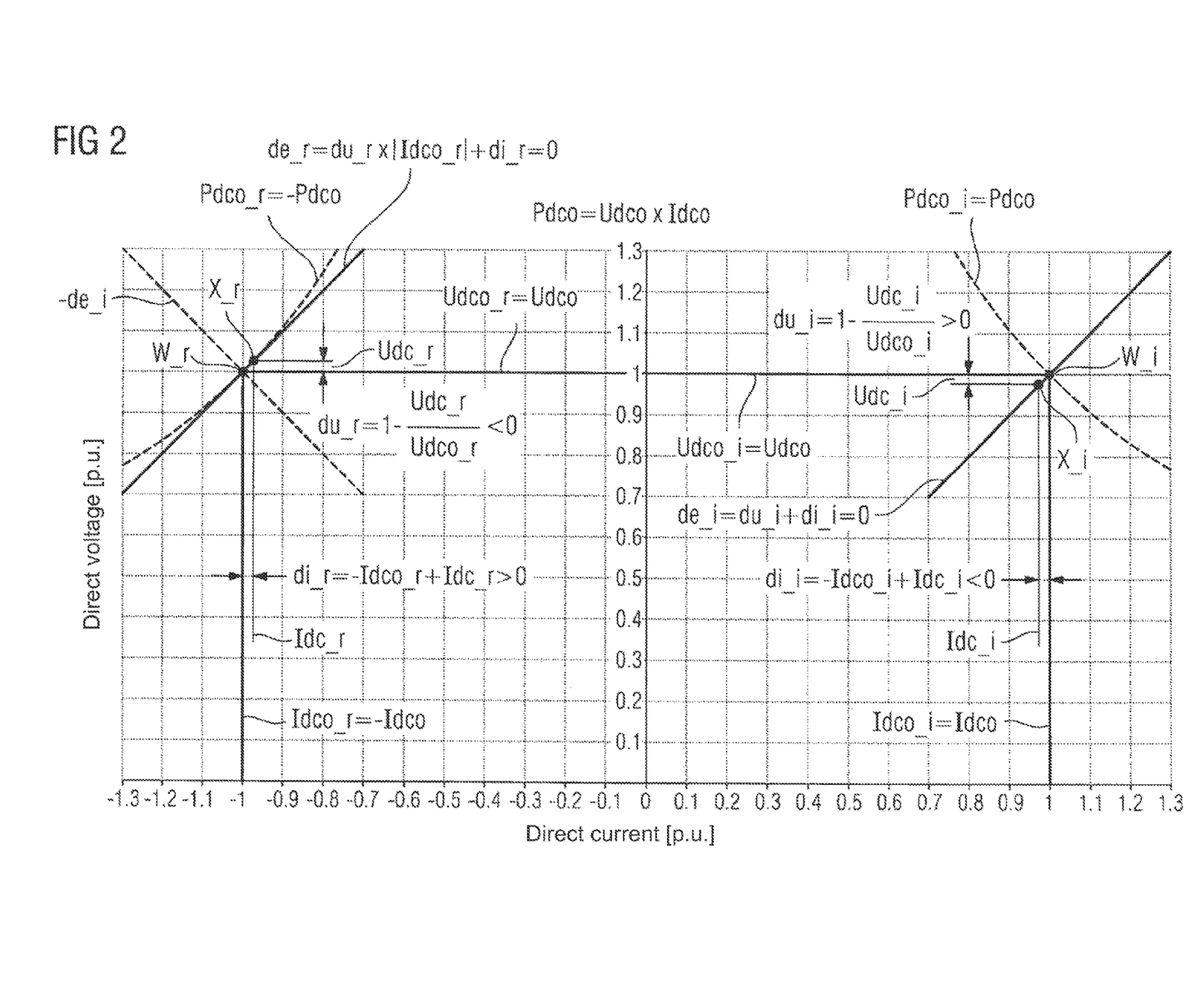
FIG. 2 shows parameters and controlled variables used by one exemplary embodiment of the closed-loop control method according to the invention.

FIG. 2 is a graph, in which the normalized direct current is shown on the abscissa and the normalized DC voltage is shown on the ordinate. This is based on the assumption that, in contrast to the illustration in FIG. 1, only one rectifier is connected via a DC voltage intermediate circuit to a VSC operating as an inverter.

In the graph, the parameters and controlled variables of the rectifier are shown in the left-hand quadrant of the graph, and corresponding variables for the inverter are shown in the right-hand quadrant. The measurement direct current and the measurement DC voltage at the measurement point X_r are plotted on the rectifier side, whose measured and nominal values are annotated _r. The measurement DC voltage Udc_r is therefore greater than the nominal DC voltage Udco or Udco_r. If the difference DC voltage du_r is formed and normalized with respect to the nominal DC voltage Udco, this results in $$du\_r = 1 - \frac{Udc\_r}{Udco\_r}.$$

This value must be less than zero for power to be transmitted to the inverter.

The nominal direct current Idco_r of the rectifier is, by definition, negative, as a result of which: Idco_r=−Idco. The difference direct current di, which is formed from the difference between the nominal and the measurement direct current, is then given by: di_r=−Idco_r+Idc_r. This is not normalized with respect to the nominal direct current Idco_r, in order to allow a nominal direct current of zero for closed-loop control. The closed-loop control is now carried out by minimizing the rectifier control error de_r=du_r*|Idco_r|+di_r being, that is to say becoming zero. The straight line shown on the left is therefore a tangent to the hyperbola which is shown by a dashed line and represents the invariant nominal DC power Pdco_r=−Pdco. Since the difference DC voltage du_r is multiplied by the magnitude of the nominal direct current |Idco_r| in order to calculate the control error de_r, this results in a stable, rapidly active control response of the rectifier, because the closed-loop voltage control is suppressed when the nominal direct currents are small. Closed-loop voltage and current control are carried out, simultaneously and in a substantially equivalent form to one another, only for higher nominal direct currents Idco_r.

The measurement direct current Idc_i and the measurement DC voltage Udc_i at the operating point X_i are plotted on the inverter side. As on the rectifier side, the difference DC voltage du_i and the difference direct current di_i are calculated, with the difference voltage du_i once again being normalized with respect to the nominal DC voltage Udco. du_i must be greater than zero for the desired power transmission. Normalization with respect to the nominal direct current in order to form the difference direct current di_i is also not carried out in this case. It is therefore also possible to preset nominal DC currents Idco_i equal to 0. For the desired power transmission, the difference direct current di_i is less than zero. The control error de_i is formed from the sum of the difference DC voltage du_i and the difference direct current di_i. The closed-loop control now attempts to minimize the control error de_i to be zero. On the graph shown in FIG. 2, this results in a straight line which intersects the hyperbola of the invariant DC power Pdco_i at the point W_i. The straight line de_i is reminiscent of the response of a pure resistance, as a result of which the inverter regulator can also be referred to as a resistance regulator.

Figure 3:
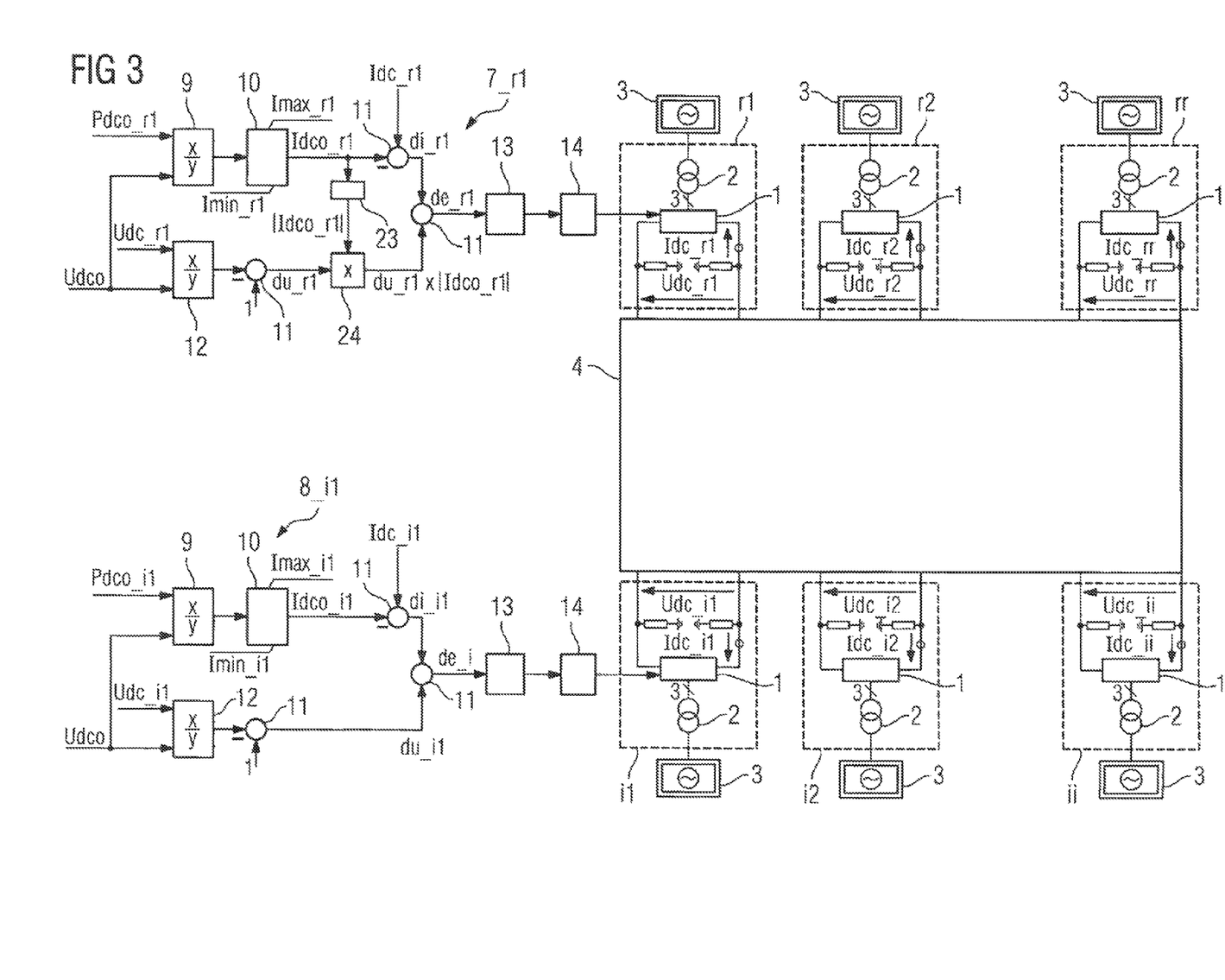
FIG. 3 shows one exemplary embodiment of the method according to the invention for a plurality of VSCs, which are linked to one another via a DC voltage system.

FIG. 3 schematically illustrates one exemplary embodiment of the method according to the invention for an HVDCT installation as shown in FIG. 1, in which the parameters and variables shown in FIG. 2 are used for a rectifier regulator 7_r1 for the rectifier station r_1, and for an inverter regulator 8_i1 for the inverter station i1. The rectifier regulators 7_rr, which are not shown in the figure, and the inverter regulator 8_ii, which is not illustrated, are physically identical.

As can be seen from FIG. 3, the rectifier regulator 7_r1, and therefore each rectifier regulator, receives a nominal DC power Pdco_r1 assigned to it. A corresponding situation applies to the inverter regulator 8_i1, in which case the respectively associated nominal DC power is transmitted from a central control station to the respective stations via communication links which are not shown, for example a simple radio link. In this case, the sum of all the nominal DC powers is equal to zero: $\Sigma Pdco\_rr + \Sigma Pdco\_ii = 0$. The invention makes complex, rapid and reliable transmission, as is the case for conventional HVDCT, superfluous.

The received nominal DC power Pdco_r1 and Pdco_i1 is in each case supplied to a divisor 9, to whose second input the nominal DC voltage Udco, which is the same for all the stations, is applied. By way of example, the nominal DC power is likewise transmitted from a central station. The divider 9 forms the quotient of the respective nominal DC power Pdco and the nominal DC voltage Udco, producing the nominal direct current Idco_r1 or Idco_i1, with the respective nominal direct current being supplied to a limiter 10, which limits the nominal direct current Idco_r1 or Idco_i1 to a respective minimum nominal direct current Imin_r1, Imin_i1 and a respective maximum nominal direct current Imax_r1, Imax_i1. The nominal direct current Idco_r1 or Idco_i1 is then supplied to an adder 11, which in each case forms the difference from the nominal direct current Idco_r1 or Idco_i1 and the measurement direct current Idco_r1 or Idco_i1. The difference direct current di_r1 obtained in this way is then supplied to a further adder 11. The value at the second input of said adder 11 is derived from the measured voltage and the nominal voltage. For this purpose, the divisor 12 in each case determines the quotient of the measurement DC voltage Udc_r1 or Udc_i1 and the nominal DC voltage Udco. The measurement DC voltage Udc_r1 or Udc_i1 which have been normalized in this way is then subtracted from 1, producing the respective difference DC voltage du_r1 or du_i1. As stated above, for the inverter regulator 8_i1, the difference DC voltage du_i1 obtained in this way is supplied to the second input of the adder 11 which, by addition of its inputs, calculates the inverter control error de_i, which is then supplied to a regulator 13.

In contrast to the inverter regulator 8_i1, in the case of the rectifier regulator 7_r1, the difference DC voltage du_r1 is multiplied by the magnitude of the nominal direct current |Idco_r1|. An absolute-value generator 23 is provided in order to form the magnitude |Idco_r1| from Idco_r1, with the product |Idco_r1|*du_r1 being formed by means of a multiplier 24. In the case of the rectifier regulator 7_r1, the difference direct current di_r1 is added to said product of du_r1 and |Idco_r1| by means of the adder 11, in order to produce the control error de_r of the rectifier. The control error of the rectifier de_r1 is then supplied to the regulator 13 and, finally, to a module management system 14, which in this case provides open-loop control for the power semiconductors in the respective VSCs.

The VSCs illustrated in FIG. 3 are so-called multilevel VSCs which, like all VSCs, consist of a bridge circuit of electrical valves. However, in the case of multilevel VSCs, each electrical valve is formed from a series circuit of bipolar submodules which each have an energy store and, in parallel with the energy store, a circuit composed of power semiconductors, such that the voltage across the energy store, or else a zero voltage, is dropped across the respective submodule depending on the operation of the power semiconductors. The voltage which is dropped in total across the electrical valves is additively composed of the output voltages of the submodules, and can therefore be changed in steps.

In order to operate the power semiconductors in the submodules, the output of the regulator 13 is connected to the input of the so-called module management system, whose detailed configuration will not be described for the purposes of the invention, since it is not essential to the invention. The module management system operates the power semiconductors in the submodules corresponding to the output of the regulator 13. However, within the scope of the invention, it is also possible for the regulator 13 to be followed by a pulse width modulator rather than by a module management system, which pulse width modulator is designed for open-loop control of two-stage or three-stage voltage source converters.

Figure 4:
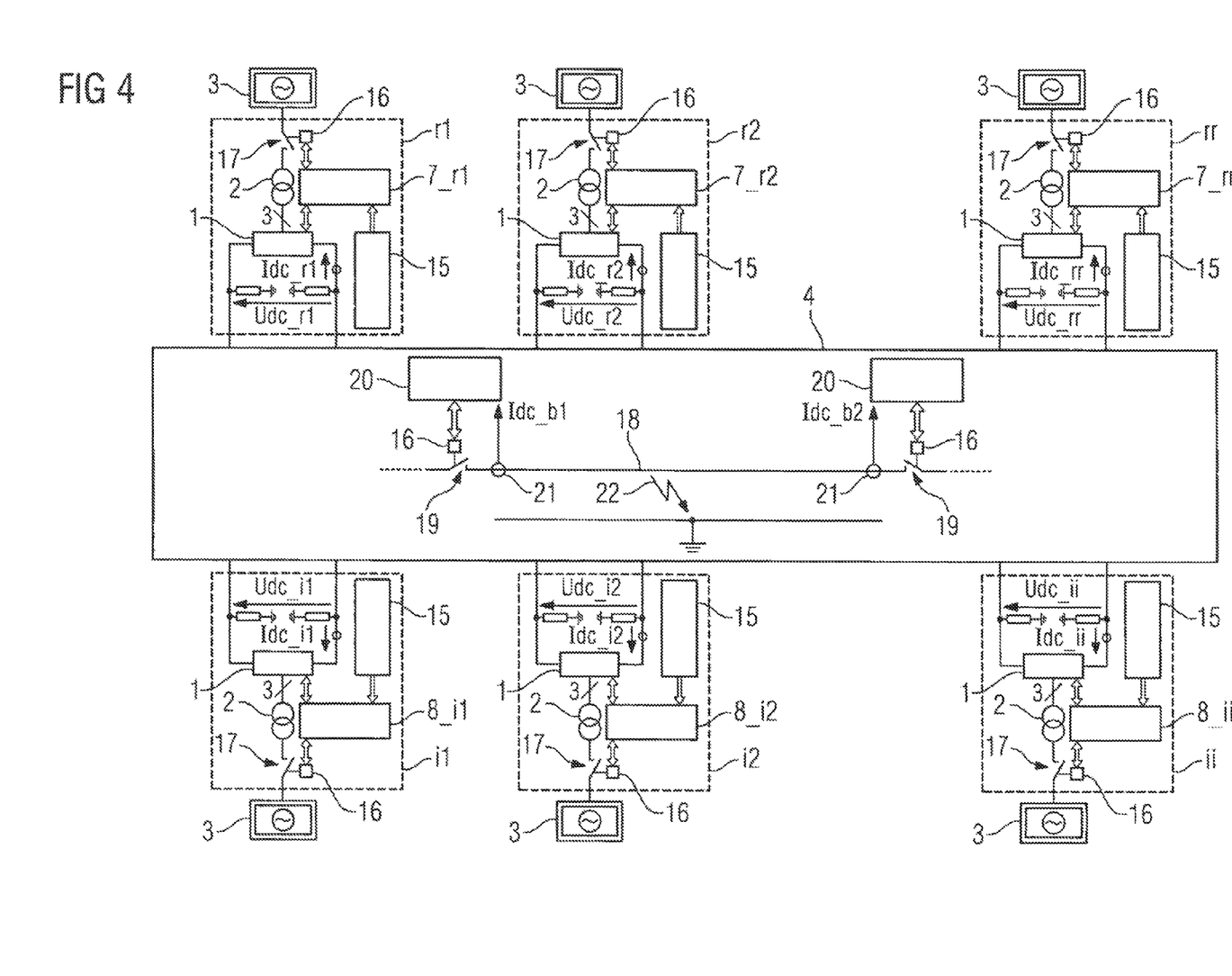
FIG. 4 shows one exemplary embodiment of the method according to the invention, in which one specific section of the DC voltage link is disconnected from the DC voltage system by means of a single isolating switch.

FIG. 4 likewise shows an HVDCT installation, in order to illustrate one exemplary embodiment of the method according to the invention. In this case as well, a plurality of rectifier stations r1, r2, . . . rr and a plurality of inverter stations i1, i2 . . . ii are once again connected to one another via a DC voltage system 4 of any desired topology. In addition to the illustration shown in FIGS. 3 and 1, each rectifier station rr and each inverter station ii has a protection unit 15 in addition to a rectifier regulator 7_rr or inverter regulator 8_ii, respectively, which protection unit 15 is connected to the respective rectifier regulator 7_rr or inverter regulator 8_ii. The respective rectifier regulator 7_rr or inverter regulator 8_ii is also in each case connected to a protection device 16 of a circuit breaker 17, with the switch 17 being arranged between the AC voltage system 3 and the transformer 2. In the event of a fault, for example high short-circuit currents, it is possible to disconnect each VSC from the respective AC system 3 by means of the multi-pole switch 17 on the AC voltage side which, for example, is a circuit breaker for switching high short-circuit currents. In this case, protection tripping takes place via the protection unit 15, which causes the respective regulating unit 7 to emit a tripping command to the protection device 16. The protection device 16 opens the circuit breaker 17 when a tripping command occurs.

In order to allow DC voltage sections 18 to also be turned off or disconnected within the DC voltage link 4, DC voltages switches 19 are arranged in the DC voltage links. A DC voltage protection unit 20 is used to trip the DC voltage switch or switches 19 and is connected to the output of a DC voltage current sensor 21, which produces direct current values Idc_b1 or Idc_b2, corresponding to the direct current flow via the respective switch 19. The DC voltage protection unit 20 is in turn connected to the protection device 16 for the DC voltage switch 19.

The arrow 22 shown in FIG. 4 indicates a ground fault, as a result of which high short-circuit currents flow in the DC voltage section 18. If the direct current values Idc_b1 and Idc_b2 which are supplied to the respective DC voltage protection unit 20 exceed a previously defined threshold value, or some other criterion, the respective DC voltage protection unit 20 defines a switching-off time $t_{off}$ in the near future, and transmits the switching-off time $t_{off}$ to the respective rectifier regulator 7_r1, 7_r2, 7_rr or inverter regulator 8_i1, 8_i2, 8_ii. These regulators are connected to a timer, such that all the regulators can determine that the switching-off time has been reached, approximately at the same time. The protection unit 15 now operates the respective regulating unit such that this in each case sets the respective nominal direct current Idco_r1, Idco_r2, Idco_rr or Idco_i1, Idco_i2 and Idco_ii to zero throughout a zero-current time period, such that the respective measurement direct current is controlled at zero. Therefore, the respective direct current Idc_b1 or Idc_b2 flowing through the direct current switches 19 is also equal to zero. The switch 19 can now be opened with no current flowing. The DC voltage protection unit 20 likewise identifies that the switching-off time has been reached, by time comparison. After a safety time interval has passed, which is shorter than a zero-current time period, the DC voltage switch 19 is opened with no current flowing, thus disconnecting the DC voltage section 18. The normal closed-loop control method is started again once the zero-current time period has elapsed. For the purposes of the invention, the respective regulators need not be informed of the change in the topology of the DC voltage link 4. The closed-loop control system automatically changes to stable closed-loop control points without any further additional effects. This allows the DC voltage system 4 to be switched with little complexity. The invention renders parallel resonant circuits, as used for DC voltage switches according to the prior art, superfluous.

The invention claimed is:

1. A method for closed-loop control of at least two converters in the field of power transmission and/or distribution, the method which comprises:
providing the converters in the form of self-commutated converters having power semiconductors that can be turned off, and wherein the converters can be controlled as rectifiers or inverters and are connected to one another via a DC voltage link;
measuring a measurement DC voltage and a measurement direct current at each converter and transmitting to a rectifier regulator for closed-loop control of a respective rectifier, or transmitting to an inverter regulator for closed-loop control of a respectively associated inverter;
with each rectifier regulator and each inverter regulator respectively forming a difference between a predetermined nominal DC voltage and the respectively received measurement DC voltage, for producing a difference DC voltage and, furthermore, forming a difference between a nominal direct current and the respectively received measurement direct current, for producing a difference direct current, wherein the measurement direct current, the measurement DC voltage, the nominal direct current, and the nominal DC voltage are in a normalized form;
each rectifier regulator controlling the respectively associated converter such that the sum of the product of the difference DC voltage and the magnitude of the nominal direct current, which is provided at the respectively associated rectifier, and the difference direct current is a minimum; and
each inverter regulator controlling the respectively associated converter such that the sum of the difference DC voltage and the difference direct current is a minimum.

2. The method according to claim 1, wherein the nominal DC voltage of each rectifier regulator and the nominal DC voltage of each inverter regulator are identical.

3. The method according to claim 1, wherein the converters are installed at a distance of at least 1 km from one another.

4. The method according to claim 1, wherein each measurement DC voltage and the nominal DC voltage are normalized with respect to the nominal DC voltage.

5. The method according to claim 1, wherein two converters are provided, one of which is operated as a rectifier and the other converter is operated as an inverter, and wherein a DC voltage intermediate circuit extends between the rectifier and the inverter.

6. The method according to claim 1, wherein at least three converters are provided, between which a DC voltage system extends.

7. The method according to claim 6, wherein a respectively associated rectifier nominal DC power or inverter nominal DC power is defined for each rectifier regulator and for each inverter regulator, respectively, wherein the sum of all the rectifier nominal DC powers and all the inverter nominal DC powers is equal to zero.

8. The method according to claim 7, which comprises determining the nominal direct current associated with the respective converter at each converter from the nominal DC power associated therewith and from the nominal DC voltage, which is common to all of them.

9. The method according to claim 1, which comprises carrying out the closed-loop control of each rectifier and each inverter over the entire operating range of the rectifier or of the inverter both on the basis of the respectively associated rectifier difference direct current and on the basis of the rectifier difference DC voltage and, respectively, on the basis of the respectively associated inverter difference direct current and on the basis of the associated inverter difference DC voltage.

10. The method according to claim 1, which comprises measuring a respective measurement DC voltage and a respective measurement direct current at each converter and transmitting to a rectifier regulator or to an inverter regulator.

11. The method according to claim 10, wherein a number of converters are controlled such that a direct current which flows through an isolating switch connecting in the DC voltage link is equal to zero.

12. The method according to claim 10, which comprises driving, with at least one converter, the respective measurement direct current recorded thereat to zero, and then opening at least one isolating switch connected in the DC voltage link.

13. The method according to claim 12, which comprises setting a switching-off time and transmitting to the respectively affected regulators, wherein said regulators control the measurement direct current associated with them to be zero when the switching-off time is reached.

14. The method according to claim 11, which comprises driving the measurement direct current to be zero with each affected converter over a zero-current time period, and then starting a normal closed-loop control method.

15. The method according to claim 11, which comprises disconnecting one of the converters from the DC voltage link by opening the isolating switches.

16. The method according to claim 11, which comprises selectively disconnecting a section of the DC voltage link from the DC voltage link by switching the isolating switches.

* * * * *